UNITED STATES PATENT OFFICE.

CHARLES WEIZMANN, OF MANCHESTER, ENGLAND, ASSIGNOR TO THE CLAYTON ANILINE COMPANY, LIMITED, OF MANCHESTER, ENGLAND.

PROCESS OF MAKING CAMPHENE.

No. 896,962.      Specification of Letters Patent.      Patented Aug. 25, 1908.

Application filed October 12, 1906. Serial No. 338,606.

*To all whom it may concern:*

Be it known that I, CHARLES WEIZMANN, of Manchester, England, have invented certain new and useful Improvements in the Manufacture of Camphene, of which the following is a specification.

It is known that camphene can be produced by heating pinene hydrochlorid with certain organic bases, but hitherto only primary and secondary organic bases have been employed for the purpose, such, for example, as methylamin and anilin, both of which, according to Brühl (see *Ber.* XXV 146) give very unsatisfactory results. It has also been proposed to use cyclic bases, such as piperidin and piperazin (see the specification of British Letters Patent No. 26620 A. D. 1901,) and it is stated that, when these are employed, a yield of eighty per cent. of camphene can be obtained.

I have found that by heating pinene hydrochlorid with a heterocyclic base of the pyridin type, such, for example, as pyridin, or quinolin, yields of from eighty-five to ninety per cent. of camphene can be obtained, and this invention consists in the use of such tertiary bases for the purpose.

The following are examples of manners in which this invention can be performed, but I do not limit myself to the details given in these examples:

Example I. A solution of 200 parts by weight of pinene hydrochlorid, in four hundred and fifty parts, by weight, of quinolin, is boiled, for about seven hours and the product, which is the result of the reaction which takes place, is acidified by sulfuric acid and the camphene is distilled off by means of steam and rectified if necessary. The product is rectified by distilling the crude camphene obtained and freezing it out afterwards. The camphene solidifies, and can be filtered off or passed through a hydro-extractor.

Example II. A solution of two hundred parts by weight of pinene hydrochlorid, in four hundred parts by weight of pyridin oils, boiling from 180° to 200° centigrade, (I take pyridin oils which begin to boil at 180°) is boiled for about ten hours. The camphene which is produced, as the result of the reaction, is then isolated in the manner described in the foregoing Example I.

The equation is as follows:

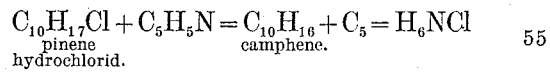

$$C_{10}H_{17}Cl + C_5H_5N = C_{10}H_{16} + C_5=H_6NCl$$
pinene hydrochlorid.      camphene.

At the high temperature (180°–200°) a molecular transposition takes place, and the pinene molecule is transformed into the camphene molecule.

Pyridin oils boiling from 180° to 200° are mixtures of pyridin and pyridin homologues, such as obtained on distillation of bone-oil or coal tar bases. I take the fraction which boils between 180° and 200°.

Having now particularly described the nature of my said invention, and in what manner the same is to be performed, I declare that what I claim is:—

A process of making camphene by boiling pinene hydrochlorid with a tertiary heterocyclic base of the pyridin type, acidifying the resultant mixture and distilling it in steam.

In testimony whereof I have affixed my signature, in presence of two witnesses.

CHARLES WEIZMANN.

Witnesses:
ERNOLD SIMPSON MOSELEY,
MALCOLM SMETHURST.